United States Patent
van Nieuwstadt et al.

(10) Patent No.: US 6,470,673 B1
(45) Date of Patent: Oct. 29, 2002

(54) CONTROL OF A NO$_X$ REDUCTANT DELIVERY SYSTEM

(75) Inventors: Michiel Jacques van Nieuwstadt, Ann Arbor; Ching-Hsong George Wu, Farmington Hills, both of MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/511,001

(22) Filed: Feb. 22, 2000

(51) Int. Cl.[7] ................................................. F01N 3/00
(52) U.S. Cl. .............................. 60/274; 60/286; 60/303
(58) Field of Search ......................... 60/274, 286, 295, 60/303, 277, 297, 292, 293, 285

(56) References Cited

U.S. PATENT DOCUMENTS

| | | | |
|---|---|---|---|
| 4,199,938 A | 4/1980 | Nakase et al. | |
| 4,222,237 A | 9/1980 | Kohama et al. | |
| 5,193,340 A | 3/1993 | Kamihara | |
| 5,353,591 A | * 10/1994 | Kabasin et al. | 60/274 |
| 5,357,749 A | 10/1994 | Ohsuga et al. | |
| 5,419,121 A | 5/1995 | Sung et al. | |
| 5,605,042 A | * 2/1997 | Stutzenberger | 60/286 |
| 5,609,022 A | 3/1997 | Cho | |
| 5,645,804 A | 7/1997 | Sumiya et al. | |
| 5,653,101 A | 8/1997 | Lane et al. | |
| 5,706,653 A | 1/1998 | Shoji et al. | |
| 5,711,149 A | 1/1998 | Araki | |
| 5,753,188 A | 5/1998 | Shimoda et al. | |
| 5,814,283 A | 9/1998 | Matuoka et al. | |
| 5,845,487 A | 12/1998 | Fraenkle et al. | |
| 5,964,089 A | * 10/1999 | Murphy et al. | 60/286 |
| 6,021,639 A | * 2/2000 | Abe et al. | 60/297 |
| 6,041,594 A | * 3/2000 | Brenner et al. | 60/309 |
| 6,050,088 A | * 4/2000 | Brenner | 60/303 |

* cited by examiner

*Primary Examiner*—Thomas Denion
*Assistant Examiner*—Binh Tran
(74) *Attorney, Agent, or Firm*—Jerome R. Drouillard

(57) ABSTRACT

A method is disclosed for controlling the delivery of compressed air and a reductant for oxides of nitrogen to a mixer from which the air/reductant mixture flows through a nozzle and into an exhaust gas created by a combustion engine. A control signal provided to an air compressor is varied as the exhaust gas pressure changes to maintain a predetermined differential pressure across the nozzle. The desired flow rate of reductant into the exhaust gas is calculated based upon the engine speed, engine load, catalyst temperature, and gas space velocity flowing through the catalyst. A reductant control signal, based upon the calculated reductant flow rate, is provided to a metering pump that delivers the reductant into the mixer. Calculations of the reductant control signal take into account the air pressure that the reductant pump sees inside the mixer.

15 Claims, 3 Drawing Sheets

CONTROL OF A NO$_x$ REDUCTANT DELIVERY SYSTEM

TECHNICAL FIELD

The present invention relates to methods for controlling the delivery of a reductant for oxides of nitrogen and compressed air to an exhaust gas produced by a combustion engine.

BACKGROUND OF THE INVENTION

Nitrogen monoxide and nitrogen dioxide, collectively referred to as oxides of nitrogen or "NO$_x$", are commonly cleaned from the exhaust gases produced by internal combustion engines using catalysts. In addition to removing NO$_x$, these catalysts also remove unburned hydrocarbons (HC) and carbon monoxide (CO). When the engine is operated with a lean air/fuel ratio, the catalyst is efficient at removing the HCs and COs because of the extra oxygen in the exhaust gas. However, the extra oxygen tends to inhibit the removal of NO$_x$. Conversely, when the engine is operated with a rich air/fuel ratio, NO$_x$ removal efficiency of the catalyst is increased but the HC and CO removal efficiency is decreased.

Designers have focused their attention in the past several years to an approach of mixing a reductant with the exhaust gas upstream of the catalyst. The presence of the reductant in the catalyst improve the NO$_x$ reduction efficiency. Furthermore, this improvement can be made in the presence of excess oxygen output from a lean burning engine, including diesel engines. For good NO$_x$ reduction efficiency, it is necessary that the reductant be thoroughly mixed with the exhaust gas. Two methods have been used to atomize a fluid reductant, pumping the fluid through a spray nozzle, and injecting the fluid into a stream of compressed air that is sprayed into the exhaust gas.

U.S. Pat. No. 5,645,804, issued to Sumiya et al. on Jul. 8, 1997, discloses three embodiments of a system that mixes a hydrocarbon reductant with the exhaust gas. In the first embodiment, a compressed air source pumps air into the exhaust gas by way of a funnel-shaped nozzle situated in the exhaust pipe. The reductant, in liquid form in a storage tank, is drawn into the funnel-shaped nozzle by the venturi effect. Control of the reductant flow rate is achieved by controlling the pressure inside the storage tank, controlling the pressure of the compressed air, or by controlling the flow rate of the compressed air. Reductant atomization is provided by the reductant entering the compressed air stream inside the funnel-shaped nozzle. Consequently, atomization effectiveness varies with the speed of the air flow in the funnel-shaped nozzle.

In the second embodiment disclosed by Sumiya et al., the hydrocarbon reductant is pumped directly from its storage tank into a spray nozzle situated inside the exhaust pipe. Control of the reductant flow rate is provided by a throttle valve. Atomization is provided by the tip of the nozzle.

The third embodiment disclosed is similar to the second embodiment with the addition of compressed air injected into the reductant just prior to the spray nozzle.

In both the second and third embodiments, the effectiveness of the reductant atomization varies with changes in the pressure differential across the tip of the nozzle.

DISCLOSURE OF THE INVENTION

The present invention provides a method for controlling an air source and a reductant source that delivers compressed air and a reductant respectively to a mixer. From the mixer, the compressed air's pressure forces the reductant through a nozzle and into an exhaust gas at a position upstream from a catalyst. The present invention provides a reductant control signal to the reductant source causing a calculated quantity of reductant per second to be delivered to the mixer. An air control signal is provided to the air source causing the compressed air pressure to be a predetermined value above the exhaust gas pressure. Maintaining a constant differential pressure across the nozzle provides good reductant atomization under all engine operating conditions.

Control of the air source is performed in closed-loop. A differential pressure error value is derived from an actual differential pressure across the nozzle and the predetermined nozzle differential pressure. Next, this differential pressure error value is transformed into the air control signal. Transformation may include integral and proportional terms. To limit oscillations, the transformation could range from slightly underdamped to overdamped and/or provide a deadband around a zero error for the differential pressure error value.

The reductant source control method calculates the desired reductant flow rate based upon the engine speed, engine load, catalyst temperature, gas space velocity flowing through the catalyst and the air pressure inside the mixer. The desired reductant flow rate is then transformed into the reductant control signal. This transformation may be accomplished in two steps. In the first step, the reductant control signal is calculated assuming that the reductant source sees a predetermined reference pressure inside the mixer. In the second step, the reductant control signal is adjusted up or down based upon the actual air pressure inside the mixer being higher or lower than the predetermined reference pressure respectively.

Alternative embodiments of the present invention include failure detection and correction methods. Detectable failures include the air supply's inability to produce the necessary compressed air pressure, and a clogged nozzle. These failures are detected by the air control signal and the actual nozzle differential pressure passing through respective thresholds in opposite directions. Failure corrections may includes outputting a failure signal, stopping the flow of reductant to the mixer, and stopping the flow of the air stream to the mixer Accordingly, it is an object of the present invention to provide a method for controlling delivery of compressed air to a nozzle to maintain a constant differential pressure across the nozzle, and control delivery of a reductant for oxides of nitrogen into the nozzle such that a calculated flow rate of the reductant is sprayed through the nozzle into the exhaust gas created by a combustion engine.

This and other objects will become more apparent from a reading of the detailed specification in conjunction with the drawings.

BEST MODE FOR CARRYING OUT THE INVENTION

Figure 1:
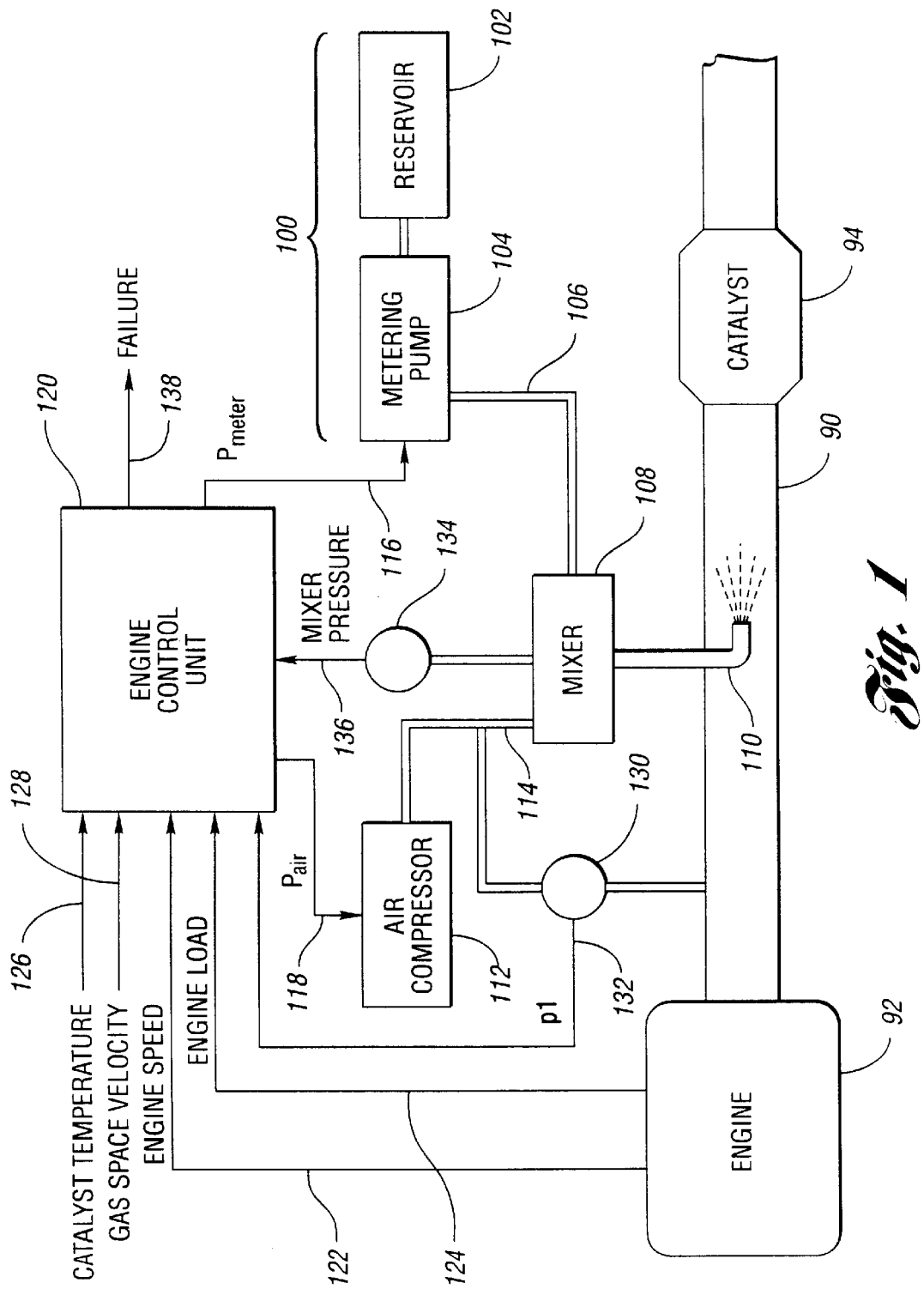
FIG. 1 is partial drawing of the hardware that the present invention controls.

An example hardware configuration of an oxides of nitrogen (NO$_x$) reductant delivery system is shown in FIG.

1. This hardware configuration is used to help explain the method of control defined by the present invention and should not be considered a limitation of the present invention The first major component of the system is a reductant source 100 consisting of a reservoir 102 and a metering pump 104. The reservoir 102 holds the $NO_x$ reductant used in the system. The metering pump 104 pumps the $NO_x$ reductant out of the reservoir 102, through line 106, and into a mixer 108 at a variable flow rate. From the mixer 108, the mixture of $NO_x$ reductant and compressed air is sprayed through a nozzle 110 into a stream of exhaust gas inside an exhaust pipe 90. The nozzle 110 is located in the exhaust pipe 90 at a position downstream from an engine 92 and upstream from a catalyst 94.

Another major component of the system is an air source that consists of an air compressor 112. Air compressor 112 provides compressed air, through line 114 and into the mixer 108 at a predetermined pressure above the exhaust gas pressure inside the exhaust pipe 90. Inside the mixer 108, the compressed air mixes will with the reductant. From the mixer 108, the mixture of compressed air and reductant forces through the nozzle 110 into the exhaust pipe 90. The pressure exerted on the reductant by the compressed air as they pass together through the nozzle 110 provides excellent atomization of the reductant as it is sprayed into the exhaust pipe 90.

A reductant control signal 116 for the metering pump 104 and an air control signal 118 for the air compressor 112 are provided by a microprocessor based engine control unit (ECU) 120. These control signals 116 and 118 allow the ECU 120 to change the speed and thus the output flow rate and output pressure provided respectively by the metering pump 104 and air compressor 112.

In the preferred embodiment, each of these control signals 116 and 118 is in the form of pulse-width and/or frequency modulated electrical power. By varying the frequency or pulse width, the speed of the metering pump 104 and air compressor 112 can be varied. An advantage of this approach is that only the minimum necessary power to achieve the desired pressures and flow rates is consumed in the air compressor 112 and metering pump 104. Other forms of control signals and other types of air compressors and metering pumps are well known in the art and may be used within the scope of the present invention. For example, the air compressor 112 and metering pump 104 could be operated at the maximum required pressure and flow rate at all times. Control would then be provided with throttle valves inserted in lines 114 and 106 respectively to decrease the pressures and flow rates to the desired values.

In the preferred embodiment, the ECU 120 has at least six inputs that it uses to determine the reductant control signal and the air control signal. An engine speed signal 122 and an engine load signal 124 provide the ECU 120 with information about the engine 92 operating condition. A catalyst temperature signal 126 and gas space velocity signal 128 of the gas flowing through the catalyst 94 provide the ECU 120 with information about $NO_x$ reductant conditions within the catalyst 94. A differential pressure sensor 130 provides a differential pressure signal 132 that indicates the pressure difference between the air compressor 112 output pressure and the exhaust pipe 90 internal pressure. Differential pressure signal 132 is substantially and indication of the differential pressure seen across the nozzle 110. Finally, a mixer absolute pressure sensor 134 provides the ECU 120 with the absolute pressure signal 136 that indicates the pressure that exists inside the mixer 108.

Figure 2:
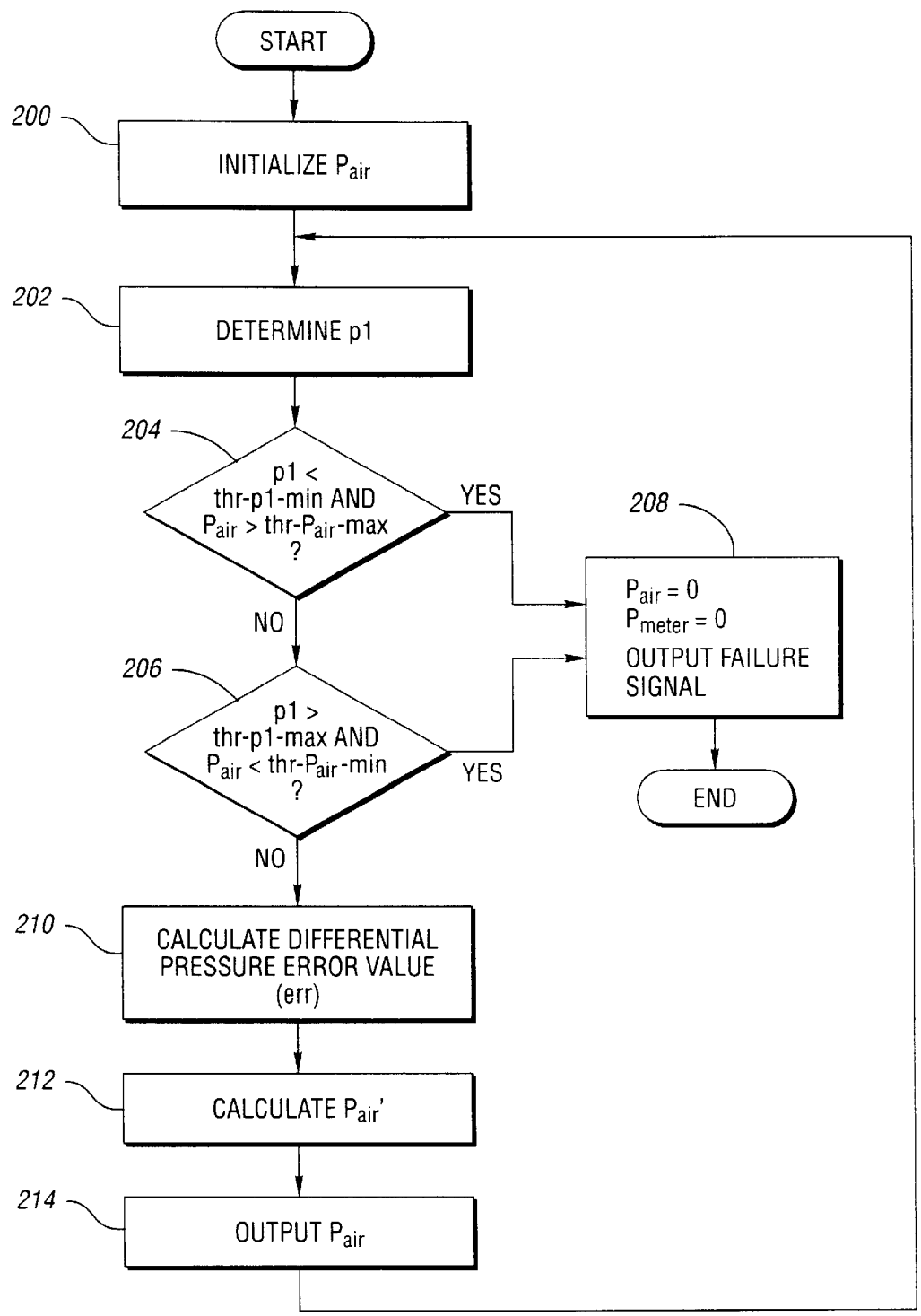
FIG. 2 is a flow diagram of a method for controlling the air source.

A flow diagram for a sequence that generates the air control signal is shown in FIG. 2. The sequence starts with initialization of the air control signal 118. The air control signal 118 has a time dependent value of $P_{air}(t)$. Air control signal 118 may be initialized to an anticipated steady state value, near mid-value, or any other value. Care must be taken in the selection of the initial air control signal to avoid triggering one of the failure conditions (described later) while the air compressor 112 is starting.

The next step in the sequence is to determine the actual differential pressure p1(t) across the nozzle 110, as shown in block 202. In the preferred embodiment, the actual differential pressure p1(t) is determined by measuring the differential pressure signal 132 from the differential pressure sensor 130. The differential pressure signal 132 may be read continuously or periodically when determining the actual nozzle differential pressure p1(t).

Failure conditions are checked for next, as shown in decision blocks 204 and 206. Decision block 204 checks for a failure of the air compressor 112 to provide adequate pressure to the mixer 108 and nozzle 110. A failure, the YES branch of decision block 204, is detected when the actual differential pressure p1(t) across the nozzle 110 is less than a minimum nozzle differential pressure threshold (thr-p1-min) while the value $P_{air}(t)$ of air control signal 118 is above a maximum air control signal threshold (thr-$P_{air}$-max). Typical values, but not necessarily the only values, for thr-p1-min and thr-$P_{air}$-max are 2 pounds per square inch(PSI) and 36 watts respectively, depending upon the size of the air compressor 112. In other words, the actual differential pressure p1(t) being produced across the nozzle 110 by the air compressor 112 is disproportionately low for the amount of power being supplied to the air compressor 112.

Decision block 206 checks for a blockage in the nozzle 110. A blockage, the YES branch of decision block 206, is detected when the actual differential pressure p1(t) across the nozzle 110 is above a maximum nozzle differential pressure threshold (thr-p1-max) while value $P_{air}(t)$ of the air control signal 118 is below a minimum air control signal threshold (thr-$P_{air}$-min). Typical values, but not necessarily the only values, for thr-p1-max and thr-$P_{air}$-min are 10 PSI and 4 watts respectively. In other words, the actual differential pressure p1(t) being produced across the nozzle 110 by the air compressor 112 is disproportionately high for the amount of power being provided to the air compressor 112.

When either or both failures are detected, the ECU 120 sets the values $P_{air}(t)$ of the air control signal 118 and the value $P_{meter}(t)$ of the reductant control signal 116 to zero values, and outputs a failure signal 138, as shown in block 208. Setting the value $P_{air}(t)$ to a zero values stops the flow of compressed air to the mixer 108 since the compressed air is not reaching the exhaust pipe 90 anyway. Setting the value $P_{meter}(t)$ to a zero value avoids an unsafe condition of having the reductant being pumped to someplace other than through the nozzle 110. Other failure conditions, such as a lower volume of reductant in the reservoir 102 and the like, may be employed to stop one or both of the air compressor 112 and metering pump 104, and generate the failure signal 138.

If no failures are detected, the sequence continues with a calculation of a differential pressure error value err(t) as a function of time, as shown in block 210. The differential pressure error value err(t) is the difference between the actual nozzle differential pressure p1(t) and a predetermined nozzle differential pressure set point $p1_{sp}$. Typical values for $p1_{sp}$ range from 5 to 10 pounds per square inch (PSI). Higher and lower values may be used depending upon the characteristics of the nozzle 110, the reductant, and the degree of atomization required. A lower limit of greater than zero PSI is required to force the compressed air and reductant out of the nozzle 110. At the high pressure end, approximately 15 PSI appears to be a practical upper limit to apply across the nozzle 110.

The differential pressure error value err(t) is then used to calculate an internal air control signal $P_{air}'(t)$, as shown in block 212. In the preferred embodiment, internal air control signal $P_{air}'(t)$ is calculated by the equation:

$$P_{air}'(t) = K_p * \text{err}(t) + \int K_i * \text{err}(t) dt$$

Proportional term $K_p$*err provides a scale factor that allows large differences between the predetermined nozzle differential pressure $p1_{sp}$ and the actual nozzle differential pressure p1 to be closed rapidly. Integral term $\int K_i$*err dt is provided in the calculation to permit the differential pressure error value err(t) to be driven to zero PSI while still providing for a non-zero internal air control signal $P_{air}'(t)$. Values for $K_p$ and $K_i$ are chosen to produce a critically damped, over damped, or slightly underdamped control loop. Severely under damped conditions are undesirable as they result in large oscillations in both the air compressor 112 and metering pump 104. In the preferred embodiment, $K_p$ has a value of zero and $K_i$ has a value of 0.3. In an alternative embodiment, the differential pressure error value err(t) may undergo a deadband transformation prior to the calculation of $P_{air}'(t)$. The deadband is positioned around zero error and helps prevent the control loop from oscillating around zero error.

Internal air control signal $P_{air}'(t)$ is then used to generate the value $P_{air}(t)$ of the air control signal 118 output from the ECU 120 to the air compressor 112, as shown in block 214. In the preferred embodiment, $P_{air}(t)$ is pulse width modulated electrical power having a pulse width proportional to the internal air control signal $P_{air}'(t)$. Other types of transformations from $P_{air}'(t)$ to $P_{air}(t)$ may be used to accommodate other hardware configurations in the air supply system.

Figure 3:
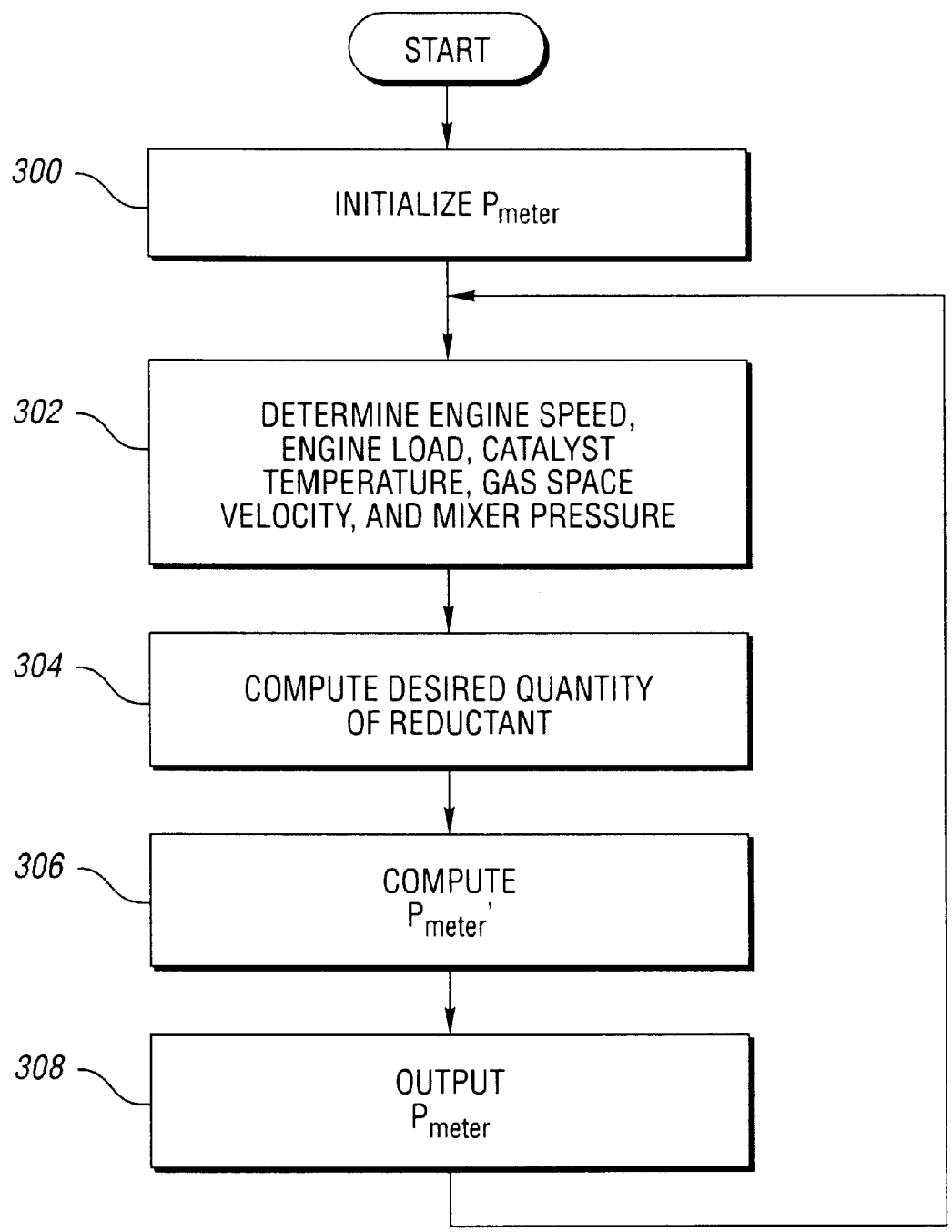
FIG. 3 is a flow diagram of a method for controlling the reductant source.

A flow diagram for a sequence that generates the reductant control signal 116 is shown in FIG. 3. The sequence starts with initialization of the value $P_{meter}(t)$ of air control signal 116, as shown in block 300. Typically the initial value for $P_{meter}(t)$ is zero to avoid any reductant entering the exhaust pipe 90 until after the engine operating conditions and catalyst conditions are known. Alternatively, a non-zero initial value may be used that assumes engine and catalyst conditions.

The next step in the sequence is a determination of the engine speed, engine load, catalyst temperature, a gas space velocity of the gap flowing through the catalyst 94, and the absolute pressure in the mixer 108, as shown in block 302. Engine speed and engine load are read from sensors (not shown) normally connected to the ECU 120, or sending their signals thereto. The catalyst temperature is an average temperature of the catalyst material inside one or more catalysts 94 downstream from the nozzle 110. The catalyst temperature may be measured directly by one or more temperature sensors (not shown) embedded within the catalyst 94, or implicitly based upon a measured temperature of the exhaust gas entering and/or exiting the catalyst 94. The gas space velocity of the gas flowing through the catalyst 94 is provided by a sensor (not shown) either immediately upstream of, or inside the catalyst 94. Gas space velocity may also be inferred from the engine speed and engine load. The mixer pressure is measured by a mixer absolute pressure sensor 134. In alternative embodiments, the mixer pressure may be determined by other means such as by calculation based upon the air control signal 118, an absolute pressure sensor measuring the output pressure of the air compressor 112, an exhaust gas pressure measurement, or the like.

In block 304, the ECU 120 uses values of the engine speed signal 122, engine load signal 124, catalyst temperature signal 126 and the gas space velocity signal 128 to calculate the quantity of reductant as a function of time, or flow rate, that should be sprayed into the exhaust gas to help reduce the $NO_x$ emissions. The exact equations or lookup tables used in this calculation are dependent upon the engine type and catalyst type, intended operating temperatures, type of reductant, and the like. For an automobile engine, the preferred reductant is urea or ammonia, although any other type of liquid or gaseous hydrocarbon reductant may be used. Typical reductant flow rates range from zero to 40 grams per second. ECU 120 calculations of the desired reductant flow rate may include a limiting function that prevents flow rates of greater that 40 grams per second to avoid a failure mode where an excessive amount of reductant is introduced into the exhaust gas stream. Higher flow rates and limits may be permitted if required to reduce the $NO_x$ emissions to an acceptable level.

In block 306, the ECU 120 calculates an internal control signal $P_{meter}'(t)$ as a function of time based upon the required reductant flow rate and the mixer pressure. This calculation may be performed in one or more steps using equations, lookup tables, or the like. In the preferred embodiment, the calculation is performed in two steps. A intermediate reductant control signal $P_{meter}''(t)$ is generated based upon the desired reductant flow rate and an assumed reference load pressure seen by the metering pump 104 looking into the mixer 108. The intermediate reductant control signal $P_{meter}''(t)$ is then adjusted based upon the actual mixer pressure loading the reductant source 100 to produce the internal reductant control signal $P_{meter}'(t)$. If the actual mixer pressure is greater or less than the assumed reference load pressure, then the internal reductant control signal $P_{meter}'(t)$ is increased or decreased respectively. This adjustment is made to produce the proper reductant flow rate into the mixer 108 regardless of the actual pressure inside the mixer 108.

The internal reductant control signal $P_{meter}'(t)$ is then transformed into the reductant control signal $P_{meter}(t)$ and output by the ECU 120 to the metering pump 104, as shown in block 308. In the preferred embodiment, the reductant control signal $P_{meter}(t)$ is a pulse width and/or frequency modulated power having a pulse width proportional to the internal reductant control signal $P_{meter}'(t)$. As with the air control signal $P_{air}(t)$, other types of transformations from $P_{meter}'(t)$ to $P_{meter}(t)$ may be used to accommodate other hardware configurations in the reductant supply system.

Preferably, the compressed air is pumped into the mixer 108 on a continuous basis. The quantity of reductant is determined by engine operating conditions and thus may be injected on a continuous basis or cycled on and off to control the time-average flow rate of reductant into the exhaust gas.

Conditions in the engine and catalyst change continuously, and control of the differential pressure across the nozzle 104 is closed-looped, therefore sampling rates of the inputs, delays introduced by the calculations, and update rates for the outputs must be kept relatively short. A typical periodic rate for executing the sequences shown in FIG. 2 and FIG. 3 in an average automotive setting is approximately once per second. Longer periods may be used, but will result in a delay between a change in the need for the reductant in the exhaust pipe 90 and its actual delivery. Shorter periods may also be used at the expense of microprocessor resources consumed in the ECU 120. A reasonable minimal period is approximately 16 milliseconds. At this rate, the air control signal 118 and reductant control signal 116 are updated approximately once with every revolution of an engine operating at 4,000 revolutions per minute.

Other variations of hardware may be used within the scope of the present invention. For example, the differential pressure sensor 130 may be a exhaust absolute pressure sensor measuring only the pressure of the exhaust gas in the exhaust pipe 90. To determine the differential pressure across the nozzle 110, the ECU 120 would be required to perform an extra calculation to subtract the output from the exhaust absolute pressure sensor from that of the mixer absolute pressure sensor 134. In another example, the functions performed by the microprocessor within the ECU 120 could be replaced by discrete circuitry that functions on a continuous basis rather than periodically.

While the best modes for carrying out the invention have been described in detail, those familiar with the art to which this invention relates will recognize various alternative designs and embodiments for practicing the invention as defined by the following claims.

What is claimed is:

1. A method of controlling an air source and a reductant source to deliver compressed air and reductant respectively to a mixer, for supply through a nozzle into an engine exhaust gas upstream from a catalyst, the method comprising:
    maintaining an approximately constant predetermined differential pressure across the nozzle;
    calculating a desired reductant flow rate in response to engine and catalyst conditions; and
    controlling a flow rate of the reductant to produce the desired reductant flow rate calculated;
    wherein the step of maintaining an approximately constant predetermined differential pressure across the nozzle comprises the steps of:
    determining an actual nozzle differential pressure across the nozzle;
    calculating an internal air control signal based upon the actual nozzle differential pressure and the constant predetermined differential pressure;
    transforming the internal air control signal into an electrical power in response to calculating the internal air control signal; and
    outputting the electrical power to the air source in response to transforming the internal air control signal into the electrical power, to produce approximately the constant predetermined differential pressure.

2. A method of controlling an air source and a reductant source to deliver compressed air and reductant respectively to a mixer, for supply through a nozzle into an engine exhaust gas upstream from a catalyst, the method comprising:
    maintaining an approximately constant predetermined differential pressure across the nozzle;
    calculating a desired reductant flow rate in response to engine and catalyst conditions; and
    controlling a flow rate of the reductant to produce the desired reductant flow rate calculated;
    wherein the step of controlling the flow rate of the reductant comprises the steps of:
    calculating an internal reductant control signal in response to calculating the desired reductant flow rate;
    transforming the internal reductant control signal into an electrical power in response to calculating the internal reductant control signal; and
    outputting the electrical power to the reductant source in response to transforming the internal reductant control signal, to produce the desired reductant flow rate.

3. The method of claim 2 further comprising:
    determining a pressure inside the mixer; and
    adjusting the internal reductant control signal in response to the pressure inside the mixer.

4. A method of controlling an air source and a reductant source that deliver compressed air and a reductant respectively into a mixer, through a nozzle, and into an exhaust gas at a position upstream from a catalyst, the method comprising:
    providing a predetermined nozzle differential pressure set point;
    determining an engine speed, an engine load, a temperature of the catalyst, a gas space velocity flowing through the catalyst, an actual nozzle differential pressure existing across the nozzle, and a load pressure seen by the reductant source;
    calculating a differential pressure error value equaling a difference between the predetermined nozzle differential pressure set point and the actual nozzle differential pressure in response to determining the actual nozzle differential pressure;
    calculating an air control signal based upon and in response to calculating the differential pressure error value;
    outputting the air control signal to the air source in response to calculating the air control signal, to drive the differential pressure error value toward zero;
    calculating a desired reductant flow rate for the reductant based upon and in response to determining the engine speed, the engine load, the temperature of the catalyst the gas space velocity flowing though the catalyst;
    calculating a reductant control signal based upon the desired reductant flow rate and the load pressure seen by the reductant source in response to calculating the desired reductant flow rate and determining the load pressure seen by the reductant source; and
    outputting the reductant control signal to the reductant source in response to calculating the reductant control signal, to direct an actual flow rate of the reductant to be approximately equal to the desired reductant flow rate.

5. The method of claim 4 further comprising stopping delivery of the reductant into the mixer in response to the actual nozzle differential pressure falling below a minimum nozzle differential pressure threshold and the air control signal exceeding a maximum air control signal threshold.

6. The method of claim 4 further comprising stopping the delivery of the compressed air into the mixer in response to the actual nozzle differential pressure falling below a minimum nozzle differential pressure threshold and the air control signal exceeding a maximum air control signal threshold.

7. The method of claim 4 further comprising stopping delivery of the reductant into the mixer in response to the actual nozzle differential pressure exceeding a maximum nozzle differential pressure threshold and the air control signal falling below a minimum air control signal threshold.

8. The method of claim 4 further comprising stopping delivery of the compressed air into the mixer in response to the actual nozzle differential pressure exceeding a maximum nozzle differential pressure threshold and the air control signal falling below a minimum air control signal threshold.

9. The method of claim 4 wherein calculating the air control signal further comprises calculating an integral term of the air control signal based upon the differential pressure error and time, the integral term allowing the differential pressure error value to be driven to zero.

10. The method of claim 4 wherein calculating the air control signal further comprises calculating a proportional term of the air control signal based upon the differential pressure error value.

11. The method of claim 4 wherein calculating the air control signal further comprises deadbanding the differential pressure error value prior to calculating the air control signal to avoid oscillations in the air control signal as the differential pressure error value approaches zero.

12. The method of claim 4 wherein calculating the reductant control signal further comprises:

calculating an intermediate reductant control signal based upon the desired reductant flow rate and a predetermined reference load pressure seen by the reductant source in response to calculating the desired reductant flow rate; and adjusting the intermediate reductant control signal to produce the reductant control signal based upon the difference between the reference load pressure and the load pressure seen by the reductant source in response to calculating the intermediate reductant control signal and determining the load pressure seen by the reductant source.

13. A system for controlling an air source and a reductant source to deliver compressed air and reductant respectively to a mixer, for supply through a nozzle into an engine exhaust gas pipe at a location upstream from a catalyst, the system comprising:

a control unit for calculating a desired reductant flow rate in response to engine and catalyst conditions and for controlling a flow rate of the reductant from said reductant source to said mixer; and a pressure sensor for sensing at least the pressure of the exhaust gas in said exhaust pipe;

said control unit responsive to pressure sensed by said pressure sensor for controlling the output of said air source to said mixer to maintain an approximately constant predetermined differential pressure across said nozzle.

14. The system of claim 13 further comprises a mixer pressure sensor for sensing the pressure in said mixer and wherein said control unit calculates the differential pressure across said nozzle from the pressure sensed in said mixer and said exhaust pipe.

15. The system of claim 13 wherein said pressure sensor is a differential pressure sensor for sensing the pressure difference between the output of said air source and the internal pressure of said exhaust pipe and for supplying a signal related to said pressure difference to said control unit.

* * * * *